US012668706B2

(12) United States Patent
Lee et al.

(10) Patent No.: US 12,668,706 B2
(45) Date of Patent: Jun. 30, 2026

(54) ANTIBACTERIAL POLYMER COMPOSITION

(71) Applicant: LG Chem, Ltd., Seoul (KR)

(72) Inventors: Ji Seok Lee, Daejeon (KR); Hyungsam Choi, Daejeon (KR); Seonjung Jung, Daejeon (KR); Soonhee Kang, Daejeon (KR); Haesung Yun, Daejeon (KR)

(73) Assignee: LG Chem, Ltd., Seoul (KR)

(*) Notice: Subject to any disclaimer, the term of this patent is extended or adjusted under 35 U.S.C. 154(b) by 689 days.

(21) Appl. No.: 17/908,751

(22) PCT Filed: Oct. 7, 2021

(86) PCT No.: PCT/KR2021/013766

§ 371 (c)(1),
(2) Date: Sep. 1, 2022

(87) PCT Pub. No.: WO2022/075763

PCT Pub. Date: Apr. 14, 2022

(65) Prior Publication Data

US 2023/0120607 A1 Apr. 20, 2023

(30) Foreign Application Priority Data

Oct. 7, 2020 (KR) ........................ 10-2020-0129644
Oct. 7, 2021 (KR) ........................ 10-2021-0132845

(51) Int. Cl.

| | |
|---|---|
| ***C09D 5/14*** | (2006.01) |
| ***C08F 120/34*** | (2006.01) |
| ***C09D 7/20*** | (2018.01) |
| ***C09D 129/04*** | (2006.01) |

(52) U.S. Cl.

CPC .............. *C09D 5/14* (2013.01); *C08F 120/34* (2013.01); *C09D 7/20* (2018.01); *C09D 129/04* (2013.01)

(58) Field of Classification Search

None

See application file for complete search history.

(56) References Cited

U.S. PATENT DOCUMENTS

| | | | |
|---|---|---|---|
| 5,212,229 A * | 5/1993 | Taylor ................. | D06M 23/105 524/390 |
| 6,251,967 B1 | 6/2001 | Perichaud et al. | |
| 2005/0171235 A1 | 8/2005 | Harren et al. | |
| 2005/0176905 A1 | 8/2005 | Moon et al. | |
| 2008/0193497 A1* | 8/2008 | Samuelsen ............. | A01N 37/20 424/78.37 |
| 2009/0252701 A9 | 10/2009 | Kritzler | |
| 2011/0177145 A1 | 7/2011 | Erkenbrecher, Jr. et al. | |
| 2016/0262385 A1 | 9/2016 | Hoffmann et al. | |

FOREIGN PATENT DOCUMENTS

| | | | |
|---|---|---|---|
| CN | 101454406 | A | 6/2009 |
| CN | 109135232 | A | 1/2019 |
| CN | 110437727 | A | 11/2019 |
| EP | 1099474 | A1 | 5/2001 |
| JP | H01293186 | A | 11/1989 |
| JP | H06166726 | A | 6/1994 |
| JP | H10182311 | A | 7/1998 |
| JP | 2000007505 | A | 1/2000 |
| JP | 2000079159 | A | 3/2000 |
| JP | 2000154105 | A | 6/2000 |
| JP | 2005532422 | A | 10/2005 |
| JP | 2006524537 | A | 11/2006 |
| JP | 4261636 | B2 | 4/2009 |
| JP | 2015166346 | A | 9/2015 |
| JP | 2017202982 | A | 11/2017 |
| KR | 100536551 | B1 | 12/2005 |
| KR | 100601393 | B1 | 7/2006 |
| WO | 2000001479 | A1 | 1/2000 |
| WO | 2004080499 | A1 | 9/2004 |
| WO | 2007100654 | A2 | 9/2007 |

OTHER PUBLICATIONS

Liu, Yixian, "Synthesis of VO2/Poly(MMA-co-dMEMUABr) Antimicrobial/Thermochromic Dual-functional Coating and Reactivity Ratios Study", Electronic Thesis and Dissertation Repository. 6632., Nov. 1, 2019 (Year: 2019).*

International Search Report for Application No. PCT/KR2021/013766 mailed Jan. 25, 2022, pp. 1-3.

Liu, Y. et al., "Reactivity Ratios of MMA and N,N-Dimethyl-N-{2-[(2-methylprop-2-enoyl)oxy]ethyl}undecane-1-aminium Bromide in Thermal and UV Initiation Copolymerization," Industrial & Engineering Chemistry Research, Apr. 15, 2020, pp. 8965-8973, vol. 59.

Liu, Y. et al., "Synthesis of VO2/poly (MMA-co-dMEMUABr) antimicrobial/thermochromic dual-functional coatings," Progress in Organic Coatings, Feb. 14, 2020, pp. 1-9, vol. 142, article No. 105589.

Ji, W. et al., "Bactericidal Specificity and Resistance Profile of Poly(Quaternary Ammonium) Polymers and Protein-Poly(Quaternary Ammonium) Conjugates" Bio Macromolecules, ACS Publications, American Chemical Society, Jul. 2017, pp. 2583-2593, vol. 18, No. 8.

Farah, S. et al., "Quaternary ammonium poly( diethylaminoethyl methacrylate) possessing antimicrobial activity" Elsevier, Colloids and Surfaces B: Biointerfaces, Feb. 2015, pp. 608-613, vol. 128.

Lianjie, S. "Encyclopedia of Safety Science and Technology" Editorial Board of Encyclopedia of Safety Science and Technology, China Labor and Social Security Press, Jun. 2003, pp. 1-3.

(Continued)

*Primary Examiner* — Christopher M Rodd

(74) *Attorney, Agent, or Firm* — Lerner David LLP

(57) ABSTRACT

The present disclosure relates to an antibacterial polymer composition, and more particularly, to an antibacterial polymer composition that enables the preparation of a coating layer exhibiting excellent antibacterial properties.

15 Claims, 2 Drawing Sheets

(56) References Cited

OTHER PUBLICATIONS

Liu, Y. et al., "Synthesis of V02/Poly(MMA-co-dMEMUABr) antimicrobial!thermochromic dual-functional coatings" Progress in Organic Coatings, Feb. 2020, pp. 1-9, vol. 142.
Extended European Search Report including Written Opinion for Application No. 21878013.8 dated Aug. 22, 23, pp. 1-12.

* cited by examiner

[FIG. 1]
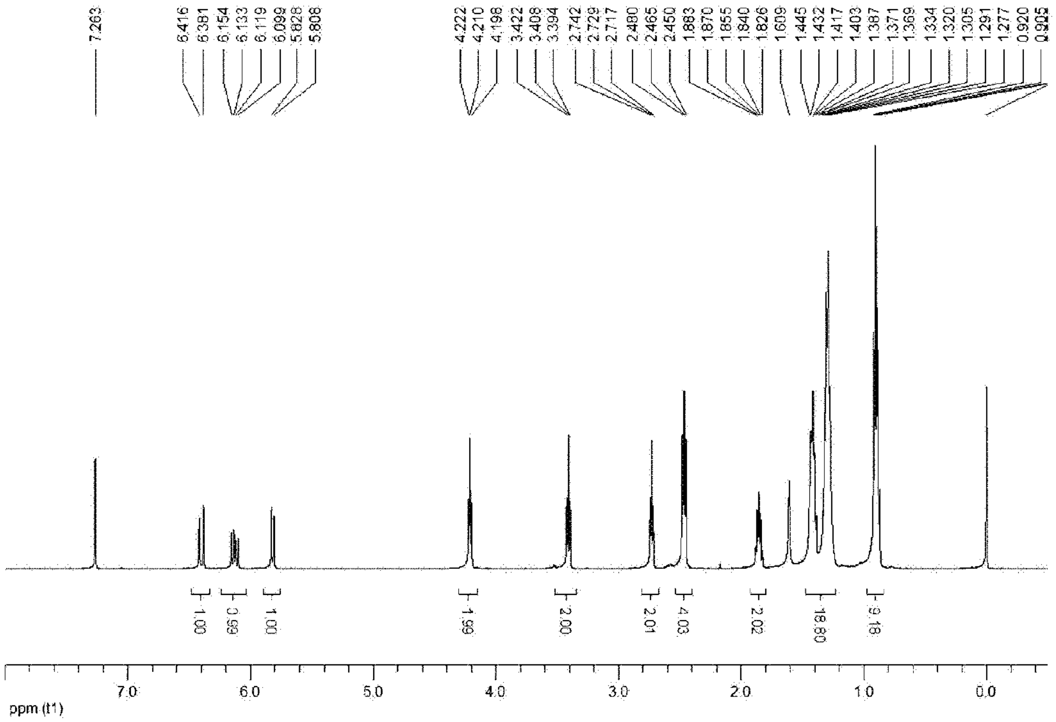
[FIG. 2]
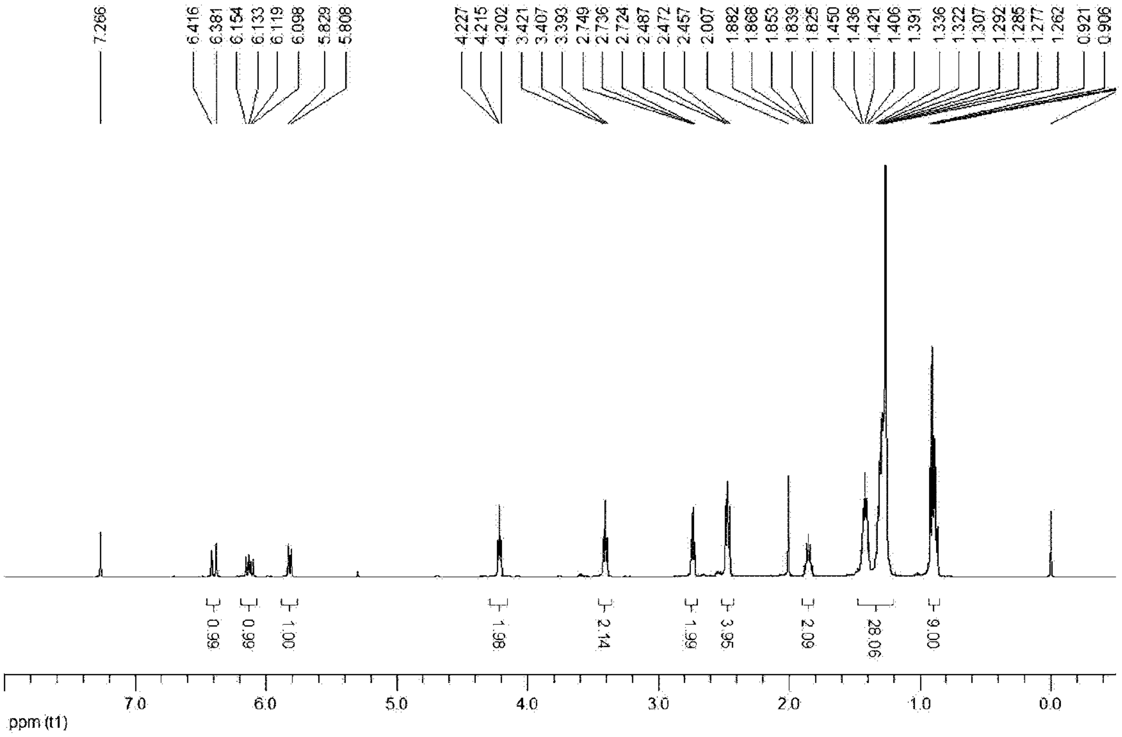

[FIG. 3]
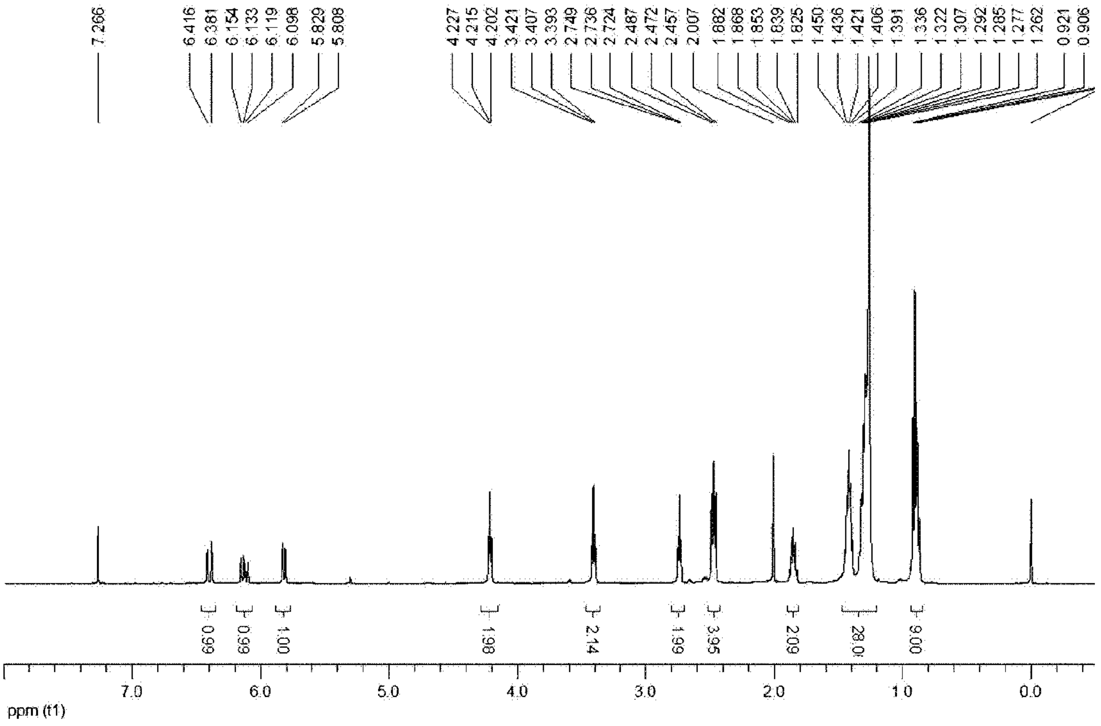

ANTIBACTERIAL POLYMER COMPOSITION

CROSS-REFERENCE TO RELATED APPLICATION(S)

The present application is a national phase entry under 35 U.S.C. § 371 of International Application No. PCT/KR2021/013766, filed on Oct. 7, 2021, which claims priority to Korean Patent Application No. 10-2020-0129644, filed on Oct. 7, 2020, and Korean Patent Application No. 10-2021-0132845, filed on Oct. 7, 2021, the disclosures of which are incorporated herein by reference in their entirety.

TECHNICAL FIELD

The present disclosure relates to an antibacterial polymer composition.

BACKGROUND ART

In recent years, along with the diversification of life, the improvement of living standards, and the changes and improvement of consciousness, there is a growing interest in improving hygiene and comfort in the living environment of individuals. Thus, studies on microorganisms that threaten these are being conducted, but not only the types of microorganisms present in the daily living environment are very large, but also the microorganisms are widely distributed in the natural world, and the damage resulting therefrom becomes serious.

In particular, microorganisms such as bacteria and mold can inhabit in various environments such as dietary life, housing environment, clothing, and industrial products. At this time, the bacteria can cause various inflammations, food poisoning or the like, and the mold not only generates a bad odor, but also causes various skin diseases, respiratory diseases, allergies, atopic dermatitis, and the like, which are problematic. In addition, in the case of microorganisms that inhabit on the surface of electronic products and daily necessities, it may be a factor of deterioration of product performance.

Therefore, in order to prevent damage to humans by these microorganisms, various antibacterial substances have been developed to inhibit the growth of microorganisms or to kill microorganisms.

Specifically, the conventionally developed antibacterial agents can be broadly divided into an inorganic antibacterial agent and an organic antibacterial agent. The inorganic antibacterial agent is an antibacterial agent containing a metal such as silver or copper, and has the advantage that the thermal stability is excellent, and antibacterial activity can be maintained even under high temperature conditions. Further, there is a problem that the price is expensive and it is likely to be discolored due to the metal ions contained after processing. In addition, organic antibacterial agents have advantages in that they are cheaper than inorganic antibacterial agents and have excellent antibacterial effects even in small amounts, but there has been a problem that antibacterial sustainability is not good because it is likely to be eluted after application to the product.

Moreover, the organic antibacterial agent can secure the stability of the product in terms of inhibition of reproduction and death of microorganisms, and at the same time, it is toxic and may also cause irritation to the user's skin.

Therefore, there is a need for an antibacterial coating composition that can be easily coated onto various products and can sustain an antibacterial activity without being eluted after coating.

DETAILED DESCRIPTION OF THE INVENTION

Technical Problem

It is one object of the present disclosure to provide an antibacterial polymer composition having an excellent effect of inhibiting the bacterial growth.

It is another object of the present disclosure to provide an antibacterial article comprising a coating layer formed by the above-mentioned antibacterial polymer composition.

Technical Solution

In order to achieve the above object, according to one aspect, there is provided an antibacterial polymer composition comprising:

a hydrophilic polymer;

an antibacterial polymer containing a repeating unit represented by the following Chemical Formula 1; and a solvent containing water:

[Chemical Formula 1]

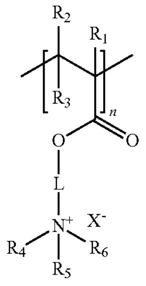

in Chemical Formula 1,

L is an alkylene having 1 to 10 carbon atoms, $R_1$ to $R_3$ are each independently hydrogen or methyl;

one of $R_4$ to $R_6$ is an alkyl having 5 to 20 carbon atoms, and the rest are each independently an alkyl having 1 to 4 carbon atoms, X is halogen, and n is an integer of 10 to 10,000.

According to another aspect, there is provided an antibacterial article comprising: a substrate; and a coating layer provided on at least one surface on the substrate, wherein the coating layer is formed by the antibacterial polymer composition.

Advantageous Effects

An antibacterial polymer composition according to the present disclosure has advantages capable of preparing a coating layer having an excellent effect of inhibiting the bacterial growth.

BRIEF DESCRIPTION OF THE DRAWING

FIG. 1 shows the NMR data ($^1$H-NMR; $CDCl_3$) of the antibacterial monomer 2-1' prepared in Preparation Example C of the present disclosure;

FIG. 2 shows the NMR data ($^1H$-NMR; $CDCl_3$) of the antibacterial monomer 2-2' prepared in Preparation Example D of the present disclosure; and FIG. 3 shows the NMR data ($^1H$-NMR; $CDCl_3$) of the antibacterial monomer 2-3' prepared in Preparation Example E of the present disclosure.

DETAILED DESCRIPTION OF THE EMBODIMENTS

As used herein, the terms "a first," "a second," etc. are used herein to explain various constitutional elements, and these terms are used only to distinguish one constitutional element from another constitutional element.

The technical terms used herein is only to explain exemplary embodiments and is not intended to limit the scope of the present disclosure. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Also, as used herein, in case a layer or an element is mentioned to be formed "on" layers or elements, it means that the layer or element is directly formed on the layers or elements, or it means that other layers or elements may be additionally formed between the layers, on a subject, or on a substrate.

Although the present disclosure may have various forms and various modifications may be made thereto, specific examples will be exemplified and explained in detail below. However, it is not intended to limit the present disclosure to specific disclosure, and it should be understood that the present disclosure includes all the modifications, equivalents or replacements thereof without departing from the spirit and technical scope of the invention.

Further, terms used in the present disclosure are used only to describe specific exemplary embodiments, and are not intended to limit the present disclosure. A singular form may include a plural form if there is no clearly opposite meaning in the context.

Meanwhile, the term "(meth)acrylate" as used herein includes not only acrylate but also methacrylate.

Further, in the present disclosure, the alkyl group may be a straight chain or branched chain, and the number of carbon atoms is not particularly limited, but is preferably 1 to 20. According to an embodiment, the number of carbon atoms in the alkyl group is 1 to 10. According to another embodiment, the number of carbon atoms in the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methyl-hexyl, and the like, but are is not limited thereto. Further, in the present disclosure, the above-mentioned description regarding the alkyl group can be applied except that the alkylene is divalent.

Generally, in order to exhibit antibacterial properties to household chemical products that are used in everyday living spaces such as homes, offices, and multiple facilities, antibacterial coating capable of preventing the growth of microorganisms and/or killing microorganisms such as bacteria has been carried out on the surface of these household chemical products. At this time, the antibacterial agent contained in the antibacterial coating damages the cell membrane or cell wall of microorganisms or induces denaturation of these proteins, which inhibits the growth of microorganisms, and reproduces and/or kills microorganisms.

Further, there are various types of bacteria (strains) to the extent that only the confirmed ones exceed 5,000 species. Specifically, bacteria have various cell shapes such as spherical, rod shaped, spiral shaped, and the like, the degree of oxygen demand also differs for each bacterium, and thus, the bacteria are classified into aerobic bacteria, facultative bacteria and anaerobic bacteria. Therefore, it was usually not easy for one type of antibacterial agent to have a physical/chemical mechanism that can damage the cell membranes/cell walls of various bacteria or denature proteins.

In addition, the antibacterial agent used for the antibacterial coating is eluted with the lapse of time, or when the user is continuously exposed to antibacterial agents, problems such as threatening the health of the user have occurred.

However, it has been found that when an antibacterial coating layer is formed on the surface of household chemical products using an aqueous polymer coating composition in which an antibacterial polymer containing a repeating unit containing a quaternary ammonium salt having a specific structure and a hydrophilic polymer are dissolved, the formed antibacterial coating layer can exhibit an antibacterial activity against at least one of Gram-positive bacteria and Gram-negative bacteria, more specifically, against both Gram-positive bacteria and Gram-negative bacteria, thereby completing the present disclosure.

The Gram-positive bacteria collectively refer to bacteria that are stained purple when stained by a Gram staining method. The cell wall of Gram-positive bacteria is composed of several layers of peptidoglycan, and thus, even if it is stained with a basic dye such as crystal violet and then treated with ethanol, it does not discolor but appears purple. Bacteria classified as such Gram-positive bacteria include *Enterococcus faecalis, Staphylococcus aureus, Streptococcus pneumoniae, Enterococcus faecium, Lactobacillus lactis*, and the like.

Further, the Gram-negative bacteria collectively refer to bacteria that are stained red when stained by a Gram staining method. The gram-negative bacteria have an outer membrane composed of lipopolysaccharide, lipoprotein, and other complex high-molecular substances, instead of having a cell wall having a relatively small amount of peptidoglycan compared to the gram-positive bacteria. Accordingly, when stained with a basic dye such as crystal violet and then treated with ethanol, discoloration occurs, and when counterstained with a red dye such as safranin, it appears a red color. Bacteria classified as such Gram-negative bacteria include *Proteus mirabilis, Escherichia coli, Salmonella typhi, Pseudomonas aeruginosa, Vibrio cholerae*, and the like.

Therefore, since the gram-positive and gram-negative bacteria can cause not only various diseases at the time of contact, but also secondary infection in severe patients with weakened immunity, it is preferable to exhibit an antibacterial activity against both the gram-positive and gram-negative bacteria using a single antibacterial agent.

On the other hand, the antibacterial polymer composition according to one embodiment exhibits an antibacterial activity against at least one of Gram-positive bacteria and Gram-negative bacteria since the antibacterial polymer contains the repeating unit represented by Chemical Formula 1. Specifically, due to the quaternary ammonium salt moiety having an alkyl group having a specific carbon number or more constituting the antibacterial polymer contained in the antibacterial polymer composition, the ammonium cation of the quaternary ammonium salt is electrostatically adsorbed on the cell wall of Gram-positive or Gram-negative bacteria, and then, the coating composition having a cell surface layer structure of bacteria by interaction with the alkyl group of the quaternary ammonium salt showing hydrophobicity can exhibit antibacterial activities.

More specifically, the antibacterial polymer composition can exhibit an antibacterial activity against at least one type of bacteria classified as gram-positive bacteria. Alternatively, the antibacterial polymer composition can exhibit an antibacterial activity against at least one type of bacteria classified as Gram-negative bacteria. Alternatively, the antibacterial polymer composition can exhibit an antibacterial activity against at least one type of bacteria classified as gram-negative bacteria and at least one type of bacteria classified as gram-positive bacteria.

In addition, in the antibacterial polymer composition according to one embodiment, a polymer including a repeating unit containing a quaternary ammonium salt having an alkyl group having a specific carbon number or more is used as an antibacterial agent, whereby unlike coating compositions that do not have such a structure, the phenomenon in which the antibacterial agent elutes from the coating layer is prevented even after a lapse of time, so that not only the antibacterial activity can be continuously exhibited, but also it is difficult to be absorbed into a human body, and the user can be free from safety issues.

Further, since the antibacterial polymer composition contains a specific amount of a hydrophilic polymer, it has an advantage that it is environmentally friendly because it does not use an organic solvent, while exhibiting workability to the extent that it can be easily applied to various types and forms of articles.

Hereinafter, the antibacterial polymer composition and the antibacterial article according to specific embodiments of the present disclosure will be described in more detail.

Antibacterial Polymer Composition

The antibacterial polymer composition of one embodiment includes a hydrophilic polymer; an antibacterial polymer containing a repeating unit represented by the following Chemical Formula 1; and a solvent containing water:

[Chemical Formula 1]

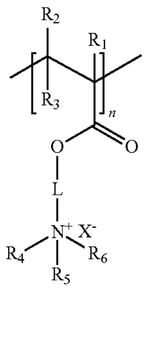

in Chemical Formula 1,

L is an alkylene having 1 to 10 carbon atoms, $R_1$ to $R_3$ are each independently hydrogen or methyl;

one of $R_4$ to $R_6$ is an alkyl having 5 to 20 carbon atoms, and the rest are each independently an alkyl having 1 to 4 carbon atoms, X is halogen, and n is an integer of 10 to 10,000.

First, the hydrophilic polymer refers to a polymer that can be dissolved in water, and due to the hydrophilic group contained in the hydrophilic polymer, it can be easily bonded to water molecules. At this time, the hydrophilic group contained in the molecule of the hydrophilic polymer may include a hydroxyl group (—OH), a carbonyl group (—C(═O)—), a carboxyl group (—COOH), and the like. When the antibacterial polymer composition includes such a hydrophilic polymer, due to the hydrophilic group contained in the hydrophilic polymer, thixotropy suitable for coating the coating composition can be imparted.

Further, since the hydrophilic polymer is easily dissolved in water, it can be excellent in compatibility with the antibacterial polymer containing the repeating unit represented by Chemical Formula 1. Moreover, a hydrogen bond may be formed with a hydrophilic group contained in the hydrophilic polymer and a nitrogen atom or an oxygen atom in the antibacterial polymer. This makes it possible to prevent elution of the antibacterial polymer that leaks from the antibacterial coating layer formed by the coating composition.

At this time, when using a polymer other than the hydrophilic polymer, the use of an organic solvent cannot be avoided for coating, which may cause a problem that the user is exposed to the organic solvent. However, in the case of the antibacterial polymer composition, it is environmentally friendly because water is used as a base. Further, since the hydrophilic antibacterial polymer is easily dissolved by water even after the coating composition is dried, the formed coating layer can be easily separated from the substrate as needed, after the antibacterial action is completed.

The hydrophilic polymer may be at least one selected from the group consisting of polyvinyl alcohol (PVA), polyethylene glycol (PEG), polyvinylpyrrolidone (PVP) and carboxymethyl cellulose (CMC). In particular, from the viewpoint that it has excellent solubility in water and is convenient to use, and the coating film layer formed after drying the coating composition well maintains the shape of the film, polyvinyl alcohol (PVA) may be used as the hydrophilic polymer, but is not limited thereto.

Further, at this time, the hydrophilic polymer preferably has a weight average molecular weight (Mw) of 100,000 to 500,000 g/mol. If it exceeds the molecular weight range of the polymer, it is not easily dissolved in water, which makes it difficult to prepare a coating solution. If the molecular weight is low, sufficient viscosity cannot be formed and so coating may be difficult. For example, the weight average molecular weight (Mw, g/mol) of the hydrophilic polymer may be 100,000 or more, 150,000 or more, or 180,000 or more, and 500,000 or less, 400,000 or less, 300,000 or less, or 250,000 or less. At this time, the weight average molecular weight of the hydrophilic polymer can be measured by the same method as in the antibacterial polymer described later.

Such hydrophilic polymer may be included in the antibacterial polymer composition in an amount of 5% to 50% by weight based on the total weight of the antibacterial polymer composition. If the content of the hydrophilic polymer is too low, there may be a problem that sufficient viscosity cannot be formed and so the coating liquid cannot be applied. If the content of the hydrophilic polymer is too high, the viscosity of the polymer rapidly increases and so the flowability of the solution deteriorates, which may make it difficult to apply the coating solution. For example, the hydrophilic polymer may be contained in an amount of 6% by weight or more, 7% by weight or more, 8% by weight or more, and 40% by weight or less, 30% by weight or less, 20% by weight or less, or 15% by weight or less, based on the total weight of the antibacterial polymer composition.

Further, the antibacterial polymer may be contained in the antibacterial polymer composition in an amount of 1 part by weight or more and less than 50 parts by weight based on 100 parts by weight of the hydrophilic polymer. When the antibacterial polymer is included in an excessively small amount in the composition, it is difficult to exhibit sufficient antibacterial and deodorant effects, and when the antibacterial polymer is contained in an excessive amount in the composition, it may pose a risk to the user's normal cells in addition to the microorganisms that generate the component, which is not suitable in terms of human safety. Moreover, the viscosity of the composition increases and thus, it is difficult to easily apply the composition to a uniform thickness on a substrate. For example, the antibacterial polymer can be contained in an amount of 3 parts by weight or more, 5 parts by weight or more, or 7 parts by weight or more, and 40 parts by weight or less, 30 parts by weight or less, 20 parts by weight or less, or 15 parts by weight or less with respect to 100 parts by weight of the hydrophilic polymer.

On the other hand, the quaternary ammonium cation contained in the repeating unit of the antibacterial polymer has a linker (L) connected to the main chain and three terminal groups, i.e., substituents $R_4$, $R_5$ and $R_6$. At this time, the linker (L) may be a linear alkylene having 1 to 10 carbon atoms. More specifically, L may be a linear alkylene having 1 to 5 carbon atoms, such as methylene, ethylene or propylene.

In addition, one of the three terminal groups, i.e., substituents $R_4$, $R_5$ and $R_6$ substituted for the quaternary ammonium cation of the antibacterial polymer is an alkyl having 5 to 20 carbon atoms. More specifically, one of the substituents $R_4$, $R_5$ and $R_6$ is a linear, i.e., straight-chain alkyl having 5 to 20 carbon atoms. At this time, when one of the substituents $R_4$, $R_5$ and $R_6$ is an alkyl having less than 5 carbon atoms, there is a problem that it does not exhibit antibacterial activities, and when it is an alkyl having more than 20 carbon atoms, the starting material for preparing the polymer is not dissolved in a solvent, so that synthesis itself is impossible.

Further, in Chemical Formula 1, one of $R_4$ to $R_6$ may be an alkyl having 5 to 20 carbon atoms, and the rest may be methyl, ethyl, propyl, or butyl.

More specifically, $R_1$ is hydrogen or methyl, $R_2$ and $R_3$ are hydrogen, one of $R_4$ to $R_6$ is an alkyl having 5 to 20 carbon atoms, and the rest are methyl, ethyl, propyl, or butyl, or $R_1$ to $R_3$ are all hydrogen, one of $R_4$ to $R_6$ is an alkyl having 5 to 20 carbon atoms, and the rest may be methyl, ethyl, propyl, or butyl.

Preferably, in Chemical Formula 1, one of $R_4$ to $R_6$ is an alkyl having 10 to 20 carbon atoms, and the rest are methyl, ethyl, propyl, or butyl. The antibacterial polymer composition containing such an antibacterial polymer can exhibit better antibacterial properties.

For example, $R_1$ is hydrogen or methyl, $R_2$ and $R_3$ are hydrogen, one of $R_4$ to $R_6$ may be an alkyl having 10 to 20 carbon atoms, and the rest may be methyl, ethyl, propyl, or butyl. An antibacterial coating composition including an antibacterial polymer containing a repeating unit of such a structure can exhibit excellent antibacterial activity against at least one of Gram-positive bacteria and Gram-positive bacteria, more specifically, against both Gram-positive bacteria and Gram-negative bacteria, even if the antibacterial polymer is contained in the antibacterial polymer composition in a small amount such as 3 to 15 parts by weight with respect to 100 parts by weight of the hydrophilic polymer.

In addition, the number of repeating units represented by Chemical Formula 1 contained in the antibacterial polymer must be at least 10, that is, n, which means the number of the repeating units, must be 10 or more, and a maximum of 10,000 or less, that is, n is 10,000 or less. When n is less than 10, there is a problem that it has an antibacterial monomer or oligomer form rather than an antibacterial polymer, and thus can be easily eluted from the coating layer formed after drying. When n exceeds 10,000, the viscosity of the coating solution increases significantly and coating may be impossible, which is thus not suitable. Specifically, n may be 50 or more, 60 or more, 70 or more, 80 or more, or 90 or more, and 5,000 or less, 1,000 or less, 500 or less, or 300 or less.

Further, in Chemical Formula 1, X may be halogen, preferably chloro (Cl) or bromo (Br).

Further, the repeating unit represented by Chemical Formula 1 may be represented by any one of Chemical Formulas 1-1 to 1-4:

[Chemical Formula 1-1]

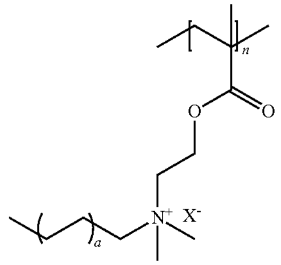

in Chemical Formula 1-1,
a is an integer of 2 to 9,
X is halogen,
n is an integer of 10 to 10,000,

[Chemical Formula 1-2]

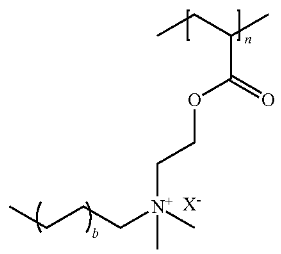

in Chemical Formula 1-2,
b is an integer of 2 to 9,
X is halogen,
n is an integer of 10 to 10,000,

[Chemical Formula 1-3]

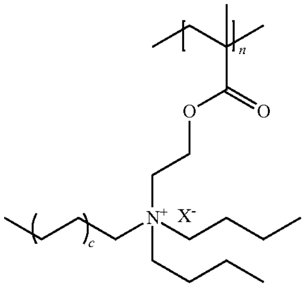

in Chemical Formula 1-3, c is an integer of 2 to 9,

X is halogen, n is an integer of 10 to 10,000,

[Chemical Formula 1-4]

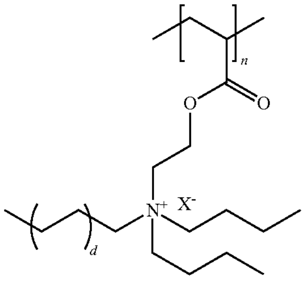

in Chemical Formula 1-4, d is an integer of 2 to 9,

X is halogen, and n is an integer of 10 to 10,000.

Preferably, in Chemical Formulas 1-1 to 1-4, a and b may be each independently an integer of 3 to 8, or 4 to 8.

At this time, the repeating unit represented by Chemical Formula 1 may be derived from a monomer compound represented by the following Chemical Formula 1'.

[Chemical Formula 1']

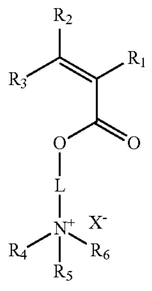

in Chemical Formula 1', the definition of each substituent is the same as defined in the Chemical Formula 1.

On the other hand, the antibacterial polymer may further include a repeating unit represented by the following Chemical Formula 2:

[Chemical Formula 2]

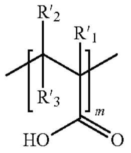

in Chemical Formula 2, $R'_1$ to $R'_3$ are each independently hydrogen or methyl, and m is an integer of 1 or more.

In Chemical Formula 2, m, which means the number of repeating units represented by Chemical Formula 2, may be an integer of 1 or more, more specifically, an integer of 1 to 2,000. If the above-mentioned range is satisfied, the carboxyl group (—COOH), which is a functional group of Chemical Formula 2, effectively forms a hydrogen bond with a hydroxyl group (—OH) present in the hydrophilic polymer, thereby further preventing the elution of the antibacterial polymer. For example, m may be 10 or more, 100 or more, 300 or more, or 500 or more, and 2,000 or less, 1,800 or less, or 1,500 or less.

For example, the repeating unit represented by Chemical Formula 2 may be represented by Chemical Formula 2-1:

[Chemical Formula 2-1]

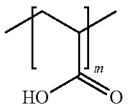

in Chemical Formula 2-1, m is an integer of 1 or more.

At this time, the repeating unit represented by Chemical Formula 2 may be derived from a monomer compound represented by the following Chemical Formula 2'.

[Chemical Formula 2']

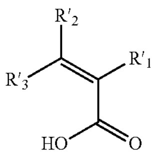

in Chemical Formula 2', the definition of each substituent is the same as defined in the Chemical Formula 1.

Therefore, the antibacterial polymer according to one embodiment is a homopolymer containing only the repeating unit represented by Chemical Formula 1, or a copolymer further containing the repeating unit represented by Chemical Formula 2. At this time, the antibacterial polymer has a one-dimensional linear polymer form having a structure in which repeating units are arranged in long chains, no matter what structure it has. This is distinguished from a network polymer having a three-dimensional network structure in which repeating units are connected by a separately added crosslinking agent. When such antibacterial polymer in the form of a linear polymer is used, the molecular weight of the polymer can be easily adjusted, and the viscosity of the antibacterial polymer can be easily adjusted.

More specifically, when the antibacterial polymer is a homopolymer, the polymer may be a linear polymer in which only the repeating units represented by Chemical Formula 1 are continuously connected.

Specifically, the linear polymer in which only the repeating units represented by Chemical Formula 1 are continuously connected is prepared by the polymerization of the monomer represented by Chemical Formula 1', and a separate end-capping agent may not be added during the polymerization.

Further, when the antibacterial polymer is a copolymer, the polymer may have a structure represented by the following Chemical Formula 3 in which the repeating unit represented by Chemical Formula 1 and the repeating unit represented by Chemical Formula 2 are linearly linked, wherein the antibacterial polymer may be a block copolymer in which the blocks of the repeating units are connected by a covalent bond, or a random copolymer in which the repeating units are randomly arranged.

[Chemical Formula 3]

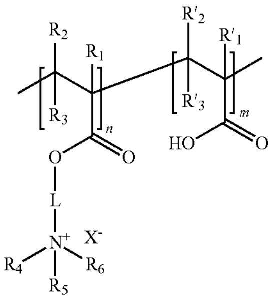

in Chemical Formula 3, the definition of each substituent is the same as defined in the Chemical Formulas 1 and 2.

For example, when the antibacterial polymer is a copolymer, the antibacterial polymer may be represented by any one of the following Chemical Formulas 3-1 to 3-4:

[Chemical Formula 3-1]

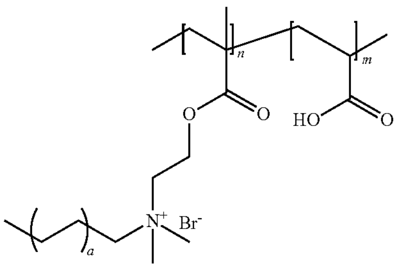

[Chemical Formula 3-2]

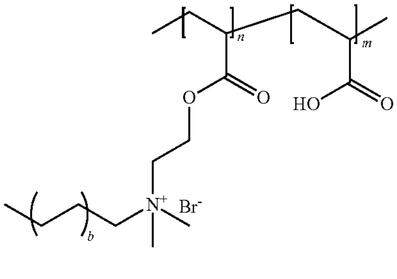

-continued

[Chemical Formula 3-3]

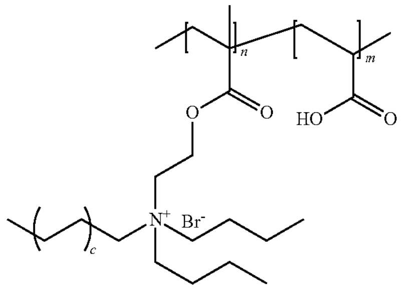

[Chemical Formula 3-4]

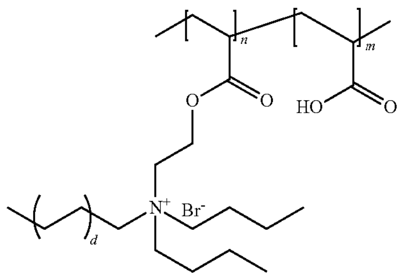

in Chemical Formulas 3-1 to 3-4, a, b, c and d are each independently an integer of 2 to 9, n is an integer of 10 to 10,000, and m is an integer of 1 or more.

Further, when the antibacterial polymer is a copolymer represented by Chemical Formula 3, the molar ratio (i.e., n:m) of the repeating unit represented by Chemical Formula 1 to the repeating unit represented by Chemical Formula 2 may be 1:0.01 to 1:100. More specifically, the molar ratio of the repeating unit represented by Chemical Formula 1 to the repeating unit represented by Chemical Formula 2 may be 1:0.1 or more, 1:1 or more, 1:2 or more, or 1:5 or more, and 1:50 or less, 1:40 or less, 1:30 or less, or 1:20 or less, but is not limited thereto.

The molar ratio of the repeating unit represented by Chemical Formula 1 to the repeating unit represented by Chemical Formula 2 may be adjusted by adjusting the reaction molar ratio of the monomer represented by Chemical Formula 1' and/or the monomer represented by Chemical Formula 2'.

Further, the antibacterial polymer may have a weight average molecular weight (Mw) of 10,000 to 1,000,000 g/mol. When the weight average molecular weight of the antibacterial polymer is less than 10,000 g/mol, it exists in a monomer form rather than a polymer form and thus, can be easily eluted. Further, due to its low molecular weight, it causes a problem of being absorbed by the human body. When the weight average molecular weight of the antibacterial polymer exceeds 1,000,000 g/mol, the molecular weight becomes larger and thus, coating is impossible or it may not be dissolved in water. More preferably, the weight average molecular weight (Mw, g/mol) of the antibacterial polymer may be 15,000 or more, 20,000 or more, 30,000 or more, or 40,000 or more, and 500,000 or less, 400,000 or less, 300,000 or less, 200,000 or less, or 150,000 or less.

At this time, the weight average molecular weight (Mw) of the antibacterial polymer can be measured by gel permeation chromatography (GPC) using polystyrene (PS) as a standard sample for calibration. More specifically, 200 mg of the antibacterial polymer was diluted with 200 ml of N,N-dimethylformamide (DMF) solvent to prepare about 1000 ppm of a sample and then, the weight average molecular weight can be measured by a RI detector at a flow rate of 1 ml/min using an Agilent 1200 series GPC instrument. At this time, the molecular weight of the sample can be calculated based on a calibration curve using 8 PS standards.

On the other hand, the solvent contained in the antibacterial polymer composition contains water. More specifically, the solvent may further include ethanol, acetone, or isopropyl alcohol. For example, the solvent contained in the antibacterial polymer composition may be water or a mixture of water and ethanol.

Further, the antibacterial polymer composition can further contain 1 to 10 parts by weight of glycerol with respect to 100 parts by weight of the hydrophilic polymer. At this time, glycerol is a compound in which three hydroxyl groups exist in the molecule, which can be contained in the antibacterial polymer composition to improve the flexibility of the film formed after the coating solution is dried.

Further, the antibacterial polymer composition may have a solid content of 5 to 50% by weight. Here, the term "solid content" refers to a component excluding the volatile component in the composition. Therefore, the content of solids present in the antibacterial polymer composition means excluding the content of the solvent, which is a volatile component, from the total weight of the antibacterial polymer composition. When only hydrophilic polymers and antibacterial polymers are contained except for solvents, the solid content means the sum of the weight of the hydrophilic polymer and the antibacterial polymer. In this case, when the solid content of the antibacterial polymer composition is too low, the viscosity of the solution is so low that it can flow like water, which makes coating impossible. When the solid content is too high, the viscosity of the coating solution becomes higher and thus, coating of the solution may be impossible, which is thus not suitable. More specifically, the solid content of the antibacterial polymer composition may be 5% by weight or more, 6% by weight or more, 7% by weight or more, 8% by weight or more, 9% by weight or more, 10% by weight or more, or 10.9% by weight or more, and 40% by weight or less, 35% by weight or less, 30% by weight or less, 25% by weight or less, 20% by weight or less, or 15% by weight or less.

Further, the antibacterial polymer composition may have a viscosity under a constant temperature/humidity condition (23° C., 50% relative humidity) of 1,000 cP to 10,000 cP as measured using Brookfield DV2T LV TJ0 viscometer with V-75 spindle at 200 rpm. When the above-mentioned viscosity range is satisfied, the workability can be secured to the extent that it can be easily applied onto a substrate to be coated, and at the same time, the solvent can be easily removed. More specifically, the viscosity of the antibacterial polymer composition may be 1,100 cP or more, 1,200 cP or more, 1,300 cP or more, 1,400 cP or more, 1,500 cP or more, 1,600 cP or more, 1,700 cP or more, 1,800 cP or more, 1,900 cP or more, 2,000 cP or more, 2,100 cP or more, 2,200 cP or more, 2,300 cP or more, 2,400 cP or more, or 2,500 cP or more, and 8,000 cP or less, 7000 cP or less, 6,000 cP or less, 5,000 cP or less, 4,000 cP or less, or 3,000 cP or less, as measured by the method described above.

In addition, the antibacterial polymer composition does not include a metal compound such as a silver compound, a copper compound, a zinc compound, and combinations thereof. When such a compound is included, the transparency of the coating composition may decrease, and thus the transparency of the final coating layer may be lowered, and the weakening of the mechanical properties may occur.

On the other hand, the antibacterial polymer composition according to one embodiment includes a hydrophilic polymer;

1 part by weight or more and less than 50 parts by weight of the antibacterial polymer with respect to 100 parts by weight of the hydrophilic polymer; and a solvent that ensures a final solid content of 5-50% by weight based on the total weight of the composition.

Such an antibacterial polymer composition is prepared by dissolving the hydrophilic polymer and the antibacterial polymer in a solvent such that the final solid content is 5 to 50% by weight.

At this time, the process of dissolving each component in the solvent may be performed by stirring at a temperature of about 45° C. to 60° C. for 60 minutes to 4 hours using a commonly known stirrer.

Further, the antibacterial polymer composition can exhibit an excellent antibacterial effect against at least one of microorganisms, particularly Gram-positive bacteria and Gram-negative bacteria. At this time, the gram-negative bacteria in which the antibacterial polymer composition exhibits antibacterial properties may be *Proteus mirabilis*, or *Escherichia coli*, and the Gram-positive bacteria may be *Enterococcus faecalis*, but is not limited thereto. More preferably, the antibacterial polymer composition can exhibit an antibacterial activity against both Gram-positive bacteria and Gram-negative bacteria. At this time, "the antibacterial polymer composition exhibits an antibacterial activity" means that the coating layer formed by coating the substrate with the antibacterial polymer composition and then drying it, that is, the coating layer formed by removing the solvent from the coating composition exhibits antibacterial activities. This can be confirmed from the fact that the bacterial growth inhibition rate measured by the evaluation of antibacterial activities using the absorbance, which will be described later, is 60% or more.

Here, *Proteus mirabilis* is Gram-negative *bacillus*, facultative anaerobic or aerobic bacteria, which are distributed in various environments, and can be infected on the respiratory organ or skin of humans and animals to cause urinary system-related diseases. In particular, when a human is infected with the *Proteus mirabilis*, it is known to cause urinary tract infection or acute pyelonephritis. In addition, *Proteus mirabilis* alkalizes urine and allows ammonia to be excreted, thereby causing odor.

Specifically, the evaluation of antibacterial activity of the antibacterial polymer composition against *Proteus mirabilis* can be measured using the absorbance, and thereby, the bacterial growth inhibition rate of the antibacterial polymer against *Proteus mirabilis* calculated by the following Equation 1 may be 60% or more.

$$\text{Bacterial growth inhibition rate (\%)} = \left(1 - \frac{A_S}{A_0}\right) \times 100 \quad \text{[Equation 1]}$$

wherein, $A_s$ is the absorbance of the experimental group, which is the absorbance at 600 nm wavelength of the culture medium of *Proteus mirabilis, E. coli, Enterococcus faecalis* to which the sample was added, and $A_0$ is the absorbance of the control group, which is the absorbance at 600 nm wavelength of a pure culture medium of *Proteus mirabilis* to which the sample was not added.

Preferably, the bacterial growth inhibition rate of the antibacterial polymer composition against *Proteus mirabilis* calculated by Equation 1 is 61% or more, 62% or more, 63% or more, 64% or more, 65% or more, 66% or more, 67% or more, 68% or more, 69% or more, 70% or more, 71% or more, 72% or more, 73% or more or more, 74% or more, 75% or more, 76% or more, or 77% or more, and 100% or less, 99.999% or less, 99% or less.

The evaluation of the antibacterial activity of the antibacterial polymer composition against each of *E. coli* and *Enterococcus faecalis* can also be performed by the same method as in the evaluation of the antibacterial activity against *Proteus mirabilis.*

Therefore, the antibacterial polymer composition according to one embodiment: i) contains a hydrophilic polymer and an antibacterial polymer having a specific structure at the same time, ii) in this case, contains the antibacterial polymer in a specific weight ratio relative to the hydrophilic polymer, and iii) contains a specific level of solid content in the composition, whereby it can be easily applied onto the substrate with a uniform thickness and thus exhibits excellent antibacterial activity against various bacteria, and can maintain such antibacterial activities even after the lapse of a long period of time, and is suitable even in terms of human safety.

Antibacterial Article

On the other hand, according to another aspect, there is provided an antibacterial article comprising: a substrate; and a coating layer provided on at least one surface on the substrate, wherein the coating layer is formed by the above-mentioned antibacterial polymer composition.

The substrate may be a polymer film such as polyethylene (PE), polypropylene (PP), polystyrene (PS), polyamide (PA), polyimide (PI), polyethylene terephthalate (PET), polyvinyl chloride (PVC), and the like.

Further, the antibacterial article is not limited to the type as long as it is household chemical products requiring antibacterial activities. Examples thereof may be agricultural films, freshness maintaining materials, containers for processed foods, electronic component packaging materials, and the like.

Further, the coating layer may be provided with a thickness of 10 μm to 100 μm, and such a coating layer may be formed by applying the antibacterial polymer composition onto at least one surface on the substrate and then drying it at a temperature of 40° C. to 80° C. for 60 to 240 minutes, thereby performing thin film coating.

Further, the coating layer can be separated from the substrate, if necessary. More specifically, the coating layer can maintain the shape of the film after the drying is completed. Accordingly, when a release-treated PET film or the like is used as a substrate, the coating layer can be separated from the substrate. This is possible because the hydrophilic polymer of the above-mentioned antibacterial polymer composition maintains the shape of the film.

Hereinafter, the action and effect of the present disclosure will be described in more detail by way of specific examples. However, these examples are for illustrative purposes only, and the scope of the invention is not defined thereby.

Preparation Example A: Preparation of Antibacterial Monomer 1-1'

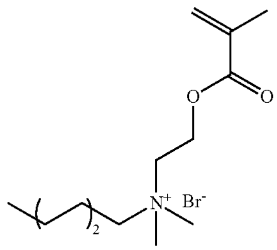

1-1'

30 ml of acetonitrile, 0.05 mol of 2-(dimethylamino)ethyl methacrylate, 0.05 mol of 1-bromohexane (octyl bromide), and 4 mg of p-methoxyphenol were added to a 250 ml flask. Then, the mixture was stirred using a magnetic bar at 45° C. for 24 hours and the reaction of substituting an alkyl group for an amino group to prepare a quaternary ammonium salt proceeded. After 24 hours, the solution in which the reaction was completed was added to 200 ml of diethyl ether solution to proceed with the extraction. Then, the reaction product was filtered using a vacuum filter, and the remaining diethyl ether was completely removed to prepare the antibacterial monomer 1-1' (15 g, yield: 75%).

$MS[M+H]^+=322$ $^1H$ NMR (500 MHz, DMSO-$d_6$, δ [ppm]): 6.07, 5.76 ($R_2$, $R_3$), 1.90 ($R_1$), 4.51, 3.70, 3.69 (L), 3.09 ($R_4$, $R_6$), 1.26, 0.87 ($R_5$) Preparation Example B: Preparation of antibacterial monomer 1-2'

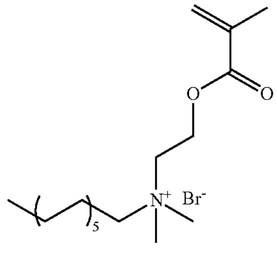

1-2'

The antibacterial monomer 1-2' (15 g, yield: 75%) was prepared in the same manner as in Preparation Example A, except that bromododecane was used instead of bromohexane in Preparation Example A.

$MS[M+H]^+=406$ $^1H$ NMR (500 MHz, DMSO-$d_6$, δ [ppm]): 6.07, 5.76 ($R_2$, $R_3$), 1.90 ($R_1$), 4.51, 3.70, 3.69 (L), 3.09 ($R_4$, $R_6$), 1.26, 0.87 ($R_5$)

Preparation Example C: Preparation of Antibacterial Monomer 2-1'

2-1'

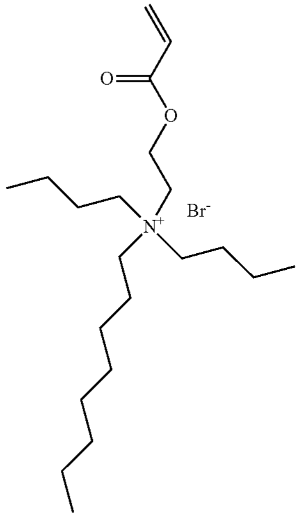

100 ml of tetrahydrofuran, 0.1 mol of 2-(dibutylamino) ethanol, 0.1 mol of triethylamine, and 0.11 g of hydroquinone were added to a 250 ml flask. While stirring the mixture, 0.1 mol of acryloyl chloride was added dropwise. Then, the mixture was stirred at room temperature for 2 hours using a magnetic bar, the reaction product was filtered using a vacuum filter, and the remaining solvent was completely removed to prepare 2-(dibutylamino)ethyl acrylate.

10 ml of acetonitrile, 0.01 mol of 2-(dibutylamino)ethyl acrylate, 0.01 mol of bromooctane, and 2 mg of p-methoxyphenol were added to a 100 ml flask. The mixture was stirred at 50° C. using a magnetic bar for 20 hours, and the reaction of substituting an alkyl group for an amino group to prepare a quaternary ammonium salt proceeded. The product was extracted from the mixture in which the reaction was completed using a hexane solvent, and the solvent was removed by a rotary evaporator to prepare an antibacterial monomer 2-1' (3.4 g, yield: 80%). The NMR data ($^1$H-NMR; $CDCl_3$) of the prepared antibacterial monomer 2-1' is shown in FIG. 1.

Preparation Example D: Preparation of Antibacterial Monomer 2-2'

2-2'

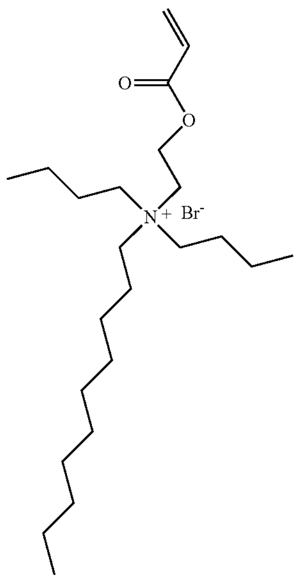

The antibacterial monomer 2-2' (4.5 g, yield: 99%) was prepared in the same manner as in Preparation Example C, except that bromodecane was used instead of bromooctane in Preparation Example C. The NMR data ($^1$H-NMR; $CDCl_3$) of the prepared antibacterial monomer 2-2' is shown in FIG. 2.

Preparation Example E: Preparation of Antibacterial Monomer 2-3'

2-3'

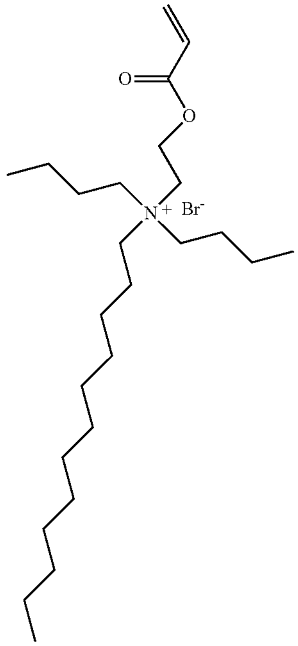

The antibacterial monomer 2-3' (4.4 g, yield: 93%) was prepared in the same manner as in Preparation Example C, except that bromododecane was used instead of bromooctane in Preparation Example C. The NMR data ($^1$H-NMR; $CDCl_3$) of the prepared antibacterial monomer 2-3' is shown in FIG. 3.

Preparation Example 1: Preparation of Antibacterial Polymer 1-1

1-1

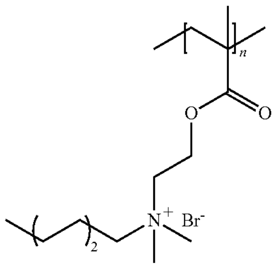

6 g of the antibacterial monomer 1-1' prepared in Preparation Example A and 2 mol % of azobisisobutylonitrile were added to 10 ml of ethanol in a 250 ml flask. Then, the mixture was stirred at a temperature of 78° C. using a magnetic bar for 8 hours to proceed with the polymerization reaction. Then, the solution in which the reaction was completed was cooled to room temperature and dissolved in a sufficient amount of water. When the dissolution was completed, an excessive amount of NaCl was added to extract a solid polymer. Then, the reaction product was filtered using a vacuum filter, ethanol and water remaining in the vacuum oven were completely removed to finally obtain the polymer 1-1.

In this case, the prepared polymer 1-1 is a homopolymer consisting of the above-mentioned repeating units, wherein the weight average molecular weight of the homopolymer was 50,000 g/mol, and n was 156. At this time, the weight average molecular weight of the polymer was measured using GPC (Agilent 1200 series GPC) and was measured by dissolving the polymer in DMF.

Preparation Example 2: Preparation of Antibacterial Polymer 1-2

1-2

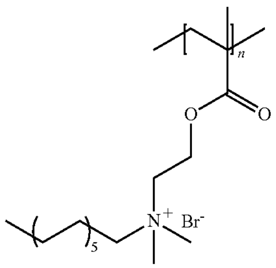

The antibacterial polymer 1-2 was prepared in the same manner as in Preparation Example 1, except that the antibacterial monomer 1-2' prepared in Preparation Example B was used instead of the antibacterial monomer 1-1' in Preparation Example 1.

In this case, the prepared polymer 1-2 is a homopolymer consisting of the above-mentioned repeating units, wherein the weight average molecular weight of the homopolymer was 70,000 g/mol, and n was 172. At this time, the weight average molecular weight of the polymer was measured using GPC (Agilent 1200 series GPC) and was measured by dissolving the polymer in DMF.

Preparation Example 3: Preparation of Antibacterial Polymer 2-1

2-1

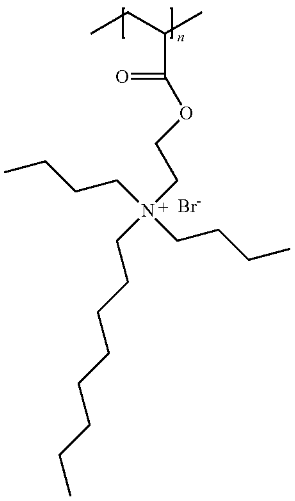

The antibacterial polymer 2-1 was prepared in the same manner as in Preparation Example 1, except that the antibacterial monomer 2-1' prepared in Preparation Example C was used instead of the antibacterial monomer 1-1' in Preparation Example 1.

In this case, the prepared polymer 2-1 is a homopolymer consisting of the above-mentioned repeating units, wherein the weight average molecular weight of the homopolymer was 61,000 g/mol, and n was 147. At this time, the weight average molecular weight of the polymer was measured using GPC (Agilent 1200 series GPC) and was measured by dissolving the polymer in DMF.

Preparation Example 4: Preparation of Antibacterial Polymer 2-2

2-2

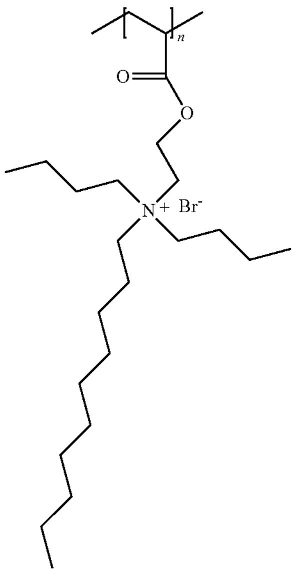

The antibacterial polymer 2-2 was prepared in the same manner as in Preparation Example 1, except that the antibacterial monomer 2-2' prepared in Preparation Example D was used instead of the antibacterial monomer 1-1' in Preparation Example 1.

In this case, the prepared polymer 2-2 is a homopolymer consisting of the above-mentioned repeating units, wherein the weight average molecular weight of the homopolymer was 63,000 g/mol, and n was 142. At this time, the weight average molecular weight of the polymer was measured using GPC (Agilent 1200 series GPC) and was measured by dissolving the polymer in DMF.

Preparation Example 5: Preparation of Antibacterial Polymer 2-3

2-3

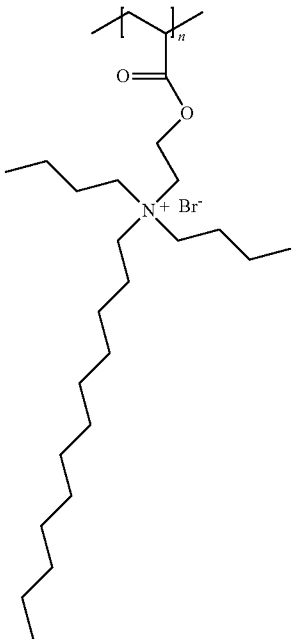

The antibacterial polymer 2-3 was prepared in the same manner as in Preparation Example 1, except that the antibacterial monomer 2-3' prepared in Preparation Example E was used instead of the antibacterial monomer 1-1' in Preparation Example 1.

In this case, the prepared polymer 2-3 is a homopolymer consisting of the above-mentioned repeating units, wherein the weight average molecular weight of the homopolymer was 77,000 g/mol, and n was 163. At this time, the weight average molecular weight of the polymer was measured using GPC (Agilent 1200 series GPC) and was measured by dissolving the polymer in DMF.

Preparation Example 6: Preparation of Antibacterial Polymer 3-1

3-1

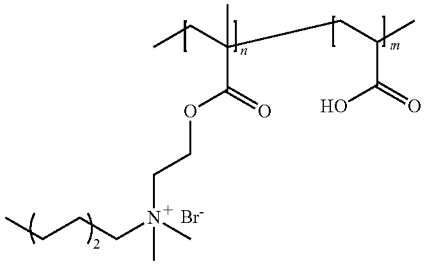

Instead of the antibacterial monomer 1-1' in Preparation Example 1, acrylic acid:antibacterial monomer 1-1' was added in a molar ratio of 10:1 in an amount of 10 parts by weight based on 100 parts by weight of water, and then an antibacterial polymer 3-1 having the above structure was prepared in the same manner as in Preparation Example 1. In this case, the prepared polymer is a copolymer consisting of the above-mentioned repeating units, wherein the weight average molecular weight of the homopolymer was 100,000 g/mol, n was 96 and m was 960. At this time, the weight average molecular weight of the polymer was measured using GPC (Agilent 1200 series GPC) and was measured by dissolving the polymer in DMF.

Preparation Example 7: Preparation of Antibacterial Polymer 3-2

3-2

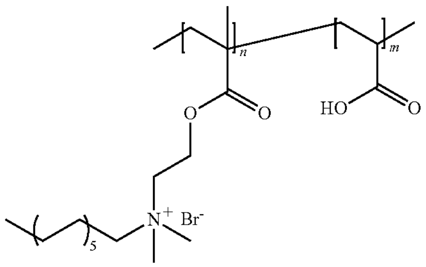

Instead of acrylic acid: antibacterial monomer 1-1' in Preparation Example 6, acrylic acid: antibacterial monomer 1-2' was added at a molar ratio of 10:1 in an amount of 10 parts by weight with respect to 100 parts by weight of water, and then an antibacterial polymer 3-2 having the above structure was prepared in the same manner as in Preparation Example 6. In this case, the prepared polymer is a copolymer consisting of the above-mentioned repeating units, wherein the weight average molecular weight of the homopolymer was 120,000 g/mol, n was 107 and m was 1070. At this time, the weight average molecular weight of the polymer was measured using GPC (Agilent 1200 series GPC) and was measured by dissolving the polymer in DMF.

Preparation Example 8: Preparation of Antibacterial Polymer 4-1

4-1

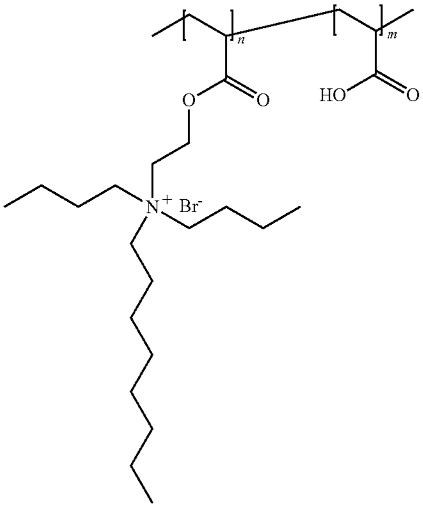

Instead of acrylic acid: antibacterial monomer 1-1' in Preparation Example 6, acrylic acid: antibacterial monomer 2-1' was added at a molar ratio of 10:1 in an amount of 10 parts by weight with respect to 100 parts by weight of water, and then an antibacterial polymer 4-1 having the above structure was prepared in the same manner as in Preparation Example 6. Wherein the weight average molecular weight of the prepared polymer was 163,000 g/mol, n was 38 and m was 380. At this time, the weight average molecular weight of the polymer was measured using GPC (Agilent 1200 series GPC) and was measured by dissolving the polymer in DMF.

Example—Preparation of Antibacterial Polymer Composition

Example 1-1

100 parts by weight of polyvinyl alcohol (PVA, weight average molecular weight (Mw): 200,000 g/mol) produced by Sigma-Aldrich as a hydrophilic polymer, and 10 parts by weight of the antibacterial polymer 1-1 prepared in Preparation Example 1 as an antibacterial polymer based on 100 parts by weight of the hydrophilic polymer (a) were added to water in an amount adjusted so as to have a final solid content of 10.9 wt. % at 60° C., and mixed for 6 hours with a magnetic stirrer (Hei-Tec, produced by Heidolph Instruments) so that the polymers were sufficiently dissolved, to prepare an antibacterial polymer composition.

The viscosity of the prepared coating composition under a constant temperature/constant humidity condition (23° C., 50% relative humidity) was 1,500 cP as measured using a Brookfield DV2T LV TJ0 viscometer with V-75 spindle at 200 rpm.

Example 1-2

An antibacterial polymer coating solution was prepared in the same manner as in Example 1-1, except that the antibacterial polymer 1-2 was used instead of the antibacterial polymer 1-1 in Example 1-1.

The viscosity of the prepared coating composition under a constant temperature/constant humidity condition (23° C., 50% relative humidity) was 2,000 cP as measured using a Brookfield DV2T LV TJ0 viscometer with V-75 spindle at 200 rpm.

Example 2-1

An antibacterial polymer coating solution was prepared in the same manner as in Example 1-1, except that the antibacterial polymer 2-1 was used instead of the antibacterial polymer 1-1 in Example 1-1.

Example 2-2

An antibacterial polymer coating solution was prepared in the same manner as in Example 1-1, except that the antibacterial polymer 2-2 was used instead of the antibacterial polymer 1-1 in Example 1-1.

Example 2-3

An antibacterial polymer coating solution was prepared in the same manner as in Example 1-1, except that the antibacterial polymer 2-3 was used instead of the antibacterial polymer 1-1 in Example 1-1.

Example 3-1

An antibacterial polymer coating solution was prepared in the same manner as in Example 1-1, except that the antibacterial polymer 3-1 was used instead of the antibacterial polymer 1-1 in Example 1-1.

The viscosity of the prepared coating composition under a constant temperature/constant humidity condition (23° C., 50% relative humidity) was 1,500 cP as measured using a Brookfield DV2T LV TJ0 viscometer with V-75 spindle at 200 rpm.

Example 3-2

An antibacterial polymer coating solution was prepared in the same manner as in Example 1-1, except that the antibacterial polymer 3-2 was used instead of the antibacterial polymer 1-1 in Example 1-1.

The viscosity of the prepared coating composition under a constant temperature/constant humidity condition (23° C., 50% relative humidity) was 2,500 cP as measured using a Brookfield DV2T LV TJ0 viscometer with V-75 spindle at 200 rpm.

Example 4-1

An antibacterial polymer coating solution was prepared in the same manner as in Example 1-1, except that the antibacterial polymer 4-1 was used instead of the antibacterial polymer 1-1 in Example 1-1.

Comparative Example 1

A polymer coating composition (solid content: 10.9 wt. %) was prepared in the same manner as in Example 1-1, except that the antibacterial polymer 1-1 in Example 1-1 was not used.

The viscosity of the prepared coating composition under a constant temperature/constant humidity condition (23° C., 50% relative humidity) was 1,300 cP as measured using a Brookfield DV2T LV TJ0 viscometer with V-75 spindle at 200 rpm.

Comparative Example 2

A polymer coating composition was prepared in the same manner as in Example 1-1, except that the content of water was adjusted so as to have a final solid content of 20 wt. %, without using the antibacterial polymer in Example 1-1.

The viscosity of the prepared coating composition under a constant temperature/constant humidity condition (23° C., 50% relative humidity) was 3,600 cP as measured using a Brookfield DV2T LV TJ0 viscometer with V-75 spindle at 200 rpm.

Comparative Example 3

First, a low molecular weight antibacterial polymer LM-1-2, which is a homopolymer having a weight average molecular weight of 2,000 g/mol and n of 5, was prepared in the same manner as in Preparation Example 2.

An antibacterial polymer composition (solid content: 10.9 wt. %) was prepared in in the same manner as in Example 1-1, except that the low molecular weight antibacterial polymer LM-1-2 prepared above was used instead of the antibacterial polymer 1-1 in Example 1-1.

The viscosity of the prepared coating composition under a constant temperature/constant humidity condition (23° C., 50% relative humidity) was 1,200 cP as measured using a Brookfield DV2T LV TJ0 viscometer with V-75 spindle at 200 rpm.

Reference Example 1

An antibacterial polymer composition was prepared in in the same manner as in Example 1-1, except that the content of the antibacterial polymer 1-1 in Example 1-1 was used in an amount of 50 parts by weight with respect to 100 parts by weight of PVA, and the content of water was adjusted so as to have a final solid content of 10.9 wt. % as in Example 1-1.

The viscosity of the prepared coating composition under a constant temperature/constant humidity condition (23° C., 50% relative humidity) was 300 cP as measured using a Brookfield DV2T LV TJ0 viscometer with V-75 spindle at 200 rpm.

Experimental Example: Evaluation of Antibacterial Activity (1) Preparation of Antibacterial Film Unless otherwise indicated, the evaluation of the following properties was performed at constant temperature/constant humidity (23±1° C., relative humidity 50±10%).

The polymer coating composition prepared in Examples, Comparative Examples and Reference Examples was applied onto a release-treated PET film (R3300N, manufactured by SKC) substrate so as to have a thickness of 200 μm using a bar coater, and then dried at 80° C. for 240 minutes to prepare an antibacterial film having a coating layer formed on one side of the substrate, respectively.

However, in the case of the polymer coating compositions of Comparative Example 2 and Reference Example 1, coating on the substrate was impossible, and the bacterial growth inhibition rate and the bacterial count could not be measured.

(2) Evaluation of Antibacterial Activity Against *Proteus mirabilis*

The antibacterial activities of each of the antibacterial films prepared above were evaluated. Specifically, in the antibacterial test, the bacterial growth inhibition rate (%) was measured by the following method, and the bacterial count was confirmed using the evaluation method of antibacterial activity according to JIS Z 2081.

25 ml of broth type medium (Nutrient broth, BD DIFCO, 8 g/L) inoculated with the test bacterium *Proteus Mirabilis* (ATCC 29906) at 3300 CFU/ml was transferred to and placed in a 50 mL conical tube, to which 0.1 g of the antibacterial film prepared above was appropriately cut and added with alcohol-sterilized scissors, and vortexed. Then, the result was incubated in a shaking incubator (VS-37SIF, produced by Visiontech) at 37° C. for 16 hours. The absorbance at 600 nm wavelength of the cultured solution was measured using a UV-Vis Spectrophotometer (Optizen POP, produced by K Lab). In addition, in a pure culture medium containing no antibacterial polymer, a solution prepared by culturing *Proteus Mirabilis* (ATCC 29906) at 37° C. for 16 hours was prepared as a control group, and the absorbance at a 600 nm wavelength was measured by the same manner as above. Using the measurement result, the bacterial growth inhibition rate (%) of *Proteus Mirabilis* (ATCC 29906) was calculated according to the following Equation 1, and the results are shown in Table 1 below.

$$\text{Bacterial growth inhibition rate (\%)} = \left(1 - \frac{A_S}{A_0}\right) \times 100 \qquad \text{[Equation 1]}$$

wherein, $A_s$ is the absorbance of the experimental group, which is the absorbance at 600 nm wavelength of *Proteus Mirabilis* culture medium to which the sample was added, and $A_0$ is the absorbance of the control group, which is the absorbance at 600 nm wavelength of *Proteus mirabilis* culture medium to which the sample was not added.

Further, after each of the antibacterial films prepared above were cut to a size of 5 cm×5 cm, an experiment was conducted using the evaluation method of antibacterial activity according to JIS Z2081. Specifically, the cells cultured for 24 hours were sequentially diluted and smeared on a solid Agar medium to check the bacterial count through the clusters that appeared, and the results are shown in Table 1 below.

TABLE 1

| | Hydrophilic polymer | Anti-bacterial polymer | Bacterial growth inhibition rate[1)] (%) | Bacterial count[2)] (CFU/ml) |
|---|---|---|---|---|
| Ex. 1-1 | PVA | 1-1 | 67 | $7.59 \times 10^3$ |
| Ex. 1-2 | PVA | 1-2 | 99.999 | 0 |
| Ex. 3-1 | PVA | 3-1 | 77 | $5.29 \times 10^3$ |
| Ex. 3-2 | PVA | 3-2 | 99.999 | 0 |
| Comparative Ex. 1 | PVA | — | 0 | $2.3 \times 10^5$ |

TABLE 1-continued

| | Hydrophilic polymer | Anti-bacterial polymer | Bacterial growth inhibition rate[1] (%) | Bacterial count[2] (CFU/ml) |
|---|---|---|---|---|
| Comparative Ex. 2 | PVA | — | Not measurable | |
| Reference Ex. 1 | PVA | 1-2 | Not measurable | |

[1]Bacterial growth inhibition rate confirmed using the absorbance measurement method

[2]Number of bacteria confirmed using the evaluation method of antibacterial activity according to JIS Z2081

Referring to Table 1, it can be seen that when an antibacterial film is prepared using the antibacterial polymer composition of Examples, it can be easily applied to the substrate with a uniform thickness and at the same time, the formed coating layer exhibits an excellent bacterial growth inhibition rate of 60% or more with respect to *Proteus mirabilis*, which is a gram-negative bacterium, unlike the antibacterial films of Comparative Examples 1 and 2 that do not contain an antibacterial polymer.

In addition, in the antibacterial film of Reference Example 1 prepared using a composition containing an antibacterial polymer in a specific content or more relative to a hydrophilic polymer, it was substantially impossible to uniformly apply the composition on the substrate, so that the bacterial growth inhibition rate and the bacterial count could not be measured. This is judged to be because the composition of Reference Example 1 has the same solid content as that of Example 1-1, but the content of the antibacterial polymer is too high relative to the weight of then hydrophilic polymer, the content of the hydrophilic polymer in the composition is lowered, the viscosity is low, and the rheology suitable for coating cannot be expressed.

(3) Antibacterial Agent Elution Test

Each of the antibacterial films having a coating layer formed by the antibacterial coating composition of Example 1-2 and the antibacterial film having a coating layer formed by the antibacterial coating composition of Comparative Example 3 was cut to a size of 5 cm×5 cm, and then the bacterial growth inhibition rate was measured by the above-described method. This was taken as the initial bacterial growth inhibition rate (To). Then, each antibacterial film was placed in an incubator (IB-05G, produced by Jeio Tech) in which the conditions of 35° C. and 90% relative humidity were formed. After 24 hours, the film was taken out and the bacterial growth inhibition rate was measured by the same method, and this was taken as the bacterial growth inhibition rate (Ti). Based on this, the variation (%) in the bacterial growth inhibition rate was calculated according to the following Equation 2, and the results are shown in Table 2 below.

[Equation 2]

$$\text{Variation in Bacterial Growth Inhibition Rate (\%)} = \left(1 - \frac{A_S}{A_0}\right) \times 100$$

TABLE 2

| | Ex. 1-2 | Comparative Ex. 3 |
|---|---|---|
| Antibacterial polymer | 1-2 | LM-1-2 |
| Variation in bacterial growth inhibition rate (%) | 1.9 | 66.7 |

Referring to Table 2, it can be seen that in the antibacterial film in which the coating layer is formed by the antibacterial coating composition of Example 1-2 has less outflow of the antibacterial agent even under high temperature conditions and thus, the antibacterial properties are not deteriorated, as compared with the antibacterial film in which a coating layer is formed by the antibacterial coating composition of Comparative Example 3. Thereby, when using the antibacterial coating composition of Examples which uses a high molecular weight antibacterial polymer containing a specific number or more of the repeating units represented by Chemical Formula 1, it prevents the elution phenomenon of the antibacterial agent even after a lapse of time, which makes it possible to prepare an antibacterial layer that continuously exhibits antibacterial properties, unlike Comparative Example 3 which uses a low molecular weight antibacterial polymer.

(4) Evaluation of Antibacterial Activity Against *E. coli*

In order to investigate the antibacterial properties of the antibacterial polymer composition prepared in Examples against *Escherichia coli*, the bacterial growth inhibition rate (%) of *E. coli* (ATCC 25922) was calculated in the same manner as in the evaluation of antibacterial activity against *Proteus mirabilis*, except that in the evaluation of an antibacterial activity against *Proteus mirabilis*, broth type medium inoculated with *E. coli* (ATCC 25922) at 105±1000 CFU/ml was used instead of broth type medium inoculated with *Proteus Mirabilis* (ATCC 7002) at 3000±300 CFU/ml. The results are shown in Table 3 below.

(5) Evaluation of Antibacterial Activity Against *Enterococcus faecalis*

In order to investigate the antibacterial properties of the antibacterial polymer composition prepared in Examples against *Enterococcus faecalis*, the bacterial growth inhibition rate (%) of *E. faecalis* (ATCC 29212) was calculated in the same manner as in the evaluation of the antibacterial activity against *Proteus Mirabilis*, except that in the evaluation of antibacterial activity against *Proteus mirabilis*, broth type medium inoculated with *E. faecalis* (ATCC 29212) at 3000±300 CFU/ml was used instead of broth type medium inoculated with *Proteus Mirabilis* (ATCC 7002) at 3000±300 CFU/ml. The results are shown in Table 3 below.

TABLE 3

| | Hydrophilic polymer | Anti-bacterial polymer | Type of bacteria | Bacterial growth inhibition rate[1] (%) |
|---|---|---|---|---|
| Ex. 1-2 | PVA | 1-2 | *Escherichia coli* | 99.99 |
| Ex. 2-1 | PVA | 2-1 | *Escherichia coli* | 99.99 |
| Ex. 2-2 | PVA | 2-2 | *Escherichia coli* | 99.99 |
| Ex. 2-3 | PVA | 2-3 | *Escherichia coli* | 99.99 |
| Ex. 4-1 | PVA | 4-1 | *Escherichia coli* | 99.99 |
| Ex. 1-2 | PVA | 1-2 | *Enterococcus faecalis* | 99.99 |
| Ex. 2-1 | PVA | 2-1 | *Enterococcus faecalis* | 99.99 |
| Ex. 2-2 | PVA | 2-2 | *Enterococcus faecalis* | 99.99 |
| Ex. 2-3 | PVA | 2-3 | *Enterococcus faecalis* | 99.99 |
| Ex. 4-1 | PVA | 4-1 | *Enterococcus faecalis* | 99.99 |

[1]Bacterial growth inhibition rate confirmed using the absorbance measurement method Referring to Table 3, it can be seen that the antibacterial film in which a coating layer is formed by the antibacterial coating composition of Examples exhibits excellent antibacterial activity against *Escherichia coli*, which is a gram-negative bacterium, and *Enterococcus faecalis*, which is a gram-positive bacterium.

Thereby, it was confirmed that by using the above-mentioned antibacterial polymer composition including a polymer containing a repeating unit having a quaternary ammonium salt moiety of a specific structure, it is possible to prepare a coating layer that exhibits antibacterial activities against both gram-positive and gram-negative bacteria, while maintaining an antibacterial activity without elution of antibacterial agents.

The invention claimed is:

1. An antibacterial polymer composition comprising:

a hydrophilic polymer;

an antibacterial polymer that is a copolymer containing a repeating unit represented by Chemical Formula 1and a repeating unit represented by Chemical Formula 2; and a solvent containing water, wherein the antibacterial polymer composition has a viscosity under a constant temperature/humidity condition (23° C., 50% relative humidity) of 1,500 cP to 3,000 cP as measured using a Brookfield DV2T LV TJ0 viscometer with V-75 spindle at 200 rpm, wherein the antibacterial polymer composition has a bacterial growth inhibition rate against *Proteus mirabilis* of 60% or more as calculated by Equation 1:

[Equation 1]

$$\text{Bacterial growth inhibition rate (\%)} = \left(1 - \frac{A_S}{A_0}\right) \times 100$$

wherein, $A_s$ is an absorbance of an experimental group at 600 nm wavelength of *Proteus mirabilis* culture medium to which a sample is added, and $A_0$ is an absorbance of a control group at 600 nm wavelength of the *Proteus mirabilis* culture medium to which the sample is not added, the experimental group is prepared by:

applying the antibacterial polymer composition onto a release-treated PET film substrate so as to have a thickness of 200 μm using a bar coater, and then drying at 80° C. for 240 minutes to prepare an antibacterial film having a coating layer formed on one side of the substrate, and transferring 25 ml of broth type medium inoculated with *Proteus Mirabilis* at 3300 CFU/ml to a 50 mL conical tube, to which 0.1 g of the antibacterial film prepared is cut and added with alcohol-sterilized scissors, vortexing, and incubating in a shaking incubator at 37° C. for 16 hours, and the control group is prepared by culturing *Proteus Mirabilis* at 37° C. for 16 hours:

[Chemical Formula 1]

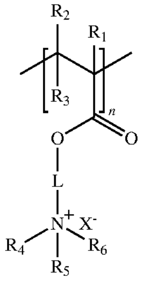

in Chemical Formula 1,

L is an alkylene having 1 to 10 carbon atoms, $R_1$ to $R_3$ are each independently hydrogen or methyl;

one of $R_4$ to $R_6$ is an alkyl having 5 to 20 carbon atoms, and the rest of $R_4$ to $R_6$ are each independently an alkyl having 1 to 4 carbon atoms, X is halogen, and n is an integer of 10 to 10,000,

[Chemical Formula 2]

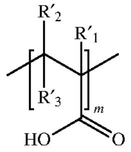

in Chemical Formula 2, $R'_1$ to $R'_3$ are each independently hydrogen or methyl, and m is an integer of 1 or more.

2. The antibacterial polymer composition of claim 1, wherein:

the hydrophilic polymer is at least one selected from the group consisting of polyvinyl alcohol (PVA), polyethylene glycol (PEG), polyvinylpyrrolidone (PVP) and carboxymethyl cellulose (CMC).

3. The antibacterial polymer composition of claim 1, wherein:

the antibacterial polymer is contained in an amount of 1 part by weight or more and less than 50 parts by weight with respect to 100 parts by weight of the hydrophilic polymer.

4. The antibacterial polymer composition of claim 1, wherein:

in Chemical Formula 1,

L is methylene, ethylene, or propylene.

5. The antibacterial polymer composition of claim 1, wherein:

in Chemical Formula 1, $R_1$ is hydrogen or methyl, $R_2$ and $R_3$ are hydrogen, one of $R_4$ to $R_6$ is an alkyl having 10 to 20 carbon atoms, and the rest of $R_4$ to $R_6$ are methyl, ethyl, propyl or butyl.

6. The antibacterial polymer composition of claim 1, wherein:

the repeating unit represented by Chemical Formula 1 is represented by any one of the following Chemical Formulas 1-1 to 1-4:

[Chemical Formula 1-1]

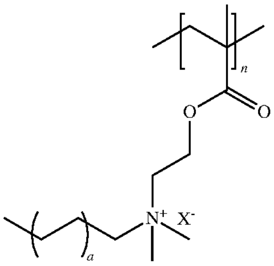

in Chemical Formula 1-1, a is an integer of 2 to 9,

X is halogen, n is an integer of 10 to 10,000,

[Chemical Formula 1-2]

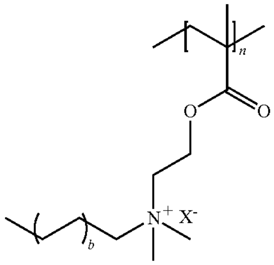

in Chemical Formula 1-2, b is an integer of 2 to 9,

X is halogen, n is an integer of 10 to 10,000,

[Chemical Formula 1-3]

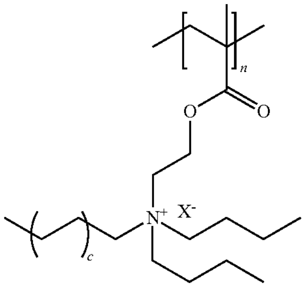

in Chemical Formula 1-3, c is an integer of 2 to 9,

X is halogen, n is an integer of 10 to 10,000,

[Chemical Formula 1-4]

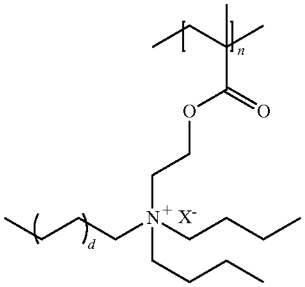

in Chemical Formula 1-4, d is an integer of 2 to 9,

X is halogen, and n is an integer of 10 to 10,000.

7. The antibacterial polymer composition of claim 1, wherein:

when the antibacterial polymer is a copolymer further containing the repeating unit represented by Chemical Formula 2, a molar ratio of the repeating unit represented by Chemical Formula 1 to the repeating unit represented by Chemical Formula 2 is 1:0.01 to 1:100.

8. The antibacterial polymer composition of claim 1, wherein:

the repeating unit represented by Chemical Formula 2 is represented by the following Chemical Formula 2-1:

[Chemical Formula 2-1]

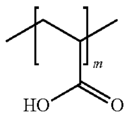

in Chemical Formula 2-1, m is an integer of 1 or more.

9. The antibacterial polymer composition of claim 1, wherein:

the antibacterial polymer has a weight average molecular weight of 10,000 to 1,000,000 g/mol.

10. The antibacterial polymer composition of claim 1, wherein:

the solvent is water or a mixture of water and ethanol.

11. The antibacterial polymer composition of claim 1, wherein:

the antibacterial polymer composition has a solid content of 5 to 50% by weight.

12. The antibacterial polymer composition of claim 1, wherein:

the antibacterial polymer composition exhibits antibacterial activity against at least one of Gram-negative bacteria and Gram-positive bacteria.

13. The antibacterial polymer composition of claim 12, wherein:

the Gram-negative bacteria is *Proteus mirabilis*, or *Escherichia coli*, and the Gram-positive bacteria is *Enterococcus faecalis*.

14. The antibacterial polymer composition of claim 12, wherein:

the antibacterial polymer composition exhibits antibacterial activity against both Gram-negative bacteria and Gram-positive bacteria.

15. An antibacterial article comprising:

a substrate; and a coating layer provided on at least one surface on the substrate, wherein the coating layer is formed by the antibacterial polymer composition according to claim 1.

* * * * *